United States Patent [19]

Hefner

[11] Patent Number: 5,742,110
[45] Date of Patent: Apr. 21, 1998

[54] DC MOTOR MAGNETIC CIRCUIT CONFIGURATION WITH HIGH FLUX DENSITY

[75] Inventor: Steven P. Hefner, Niles, Ill.

[73] Assignee: MPC Products Corporation, Niles, Ill.

[21] Appl. No.: 519,202

[22] Filed: Aug. 25, 1995

[51] Int. Cl.$^6$ .................. H02K 21/26; H02K 21/28
[52] U.S. Cl. .................. 310/154; 310/193; 310/216; 310/258
[58] Field of Search .................. 310/154, 258, 310/216, 152, 177, 193

[56] References Cited

U.S. PATENT DOCUMENTS

| | | | |
|---|---|---|---|
| 2,717,969 | 9/1955 | Buchhold et al. | 310/156 |
| 3,024,409 | 3/1962 | Brown et al. | 323/75 |
| 3,054,916 | 9/1962 | Cobb | 310/154 |
| 3,296,471 | 1/1967 | Cochardt | 310/154 |
| 3,564,705 | 2/1971 | Cochardt | 29/596 |
| 3,828,213 | 8/1974 | Yamashita et al. | 310/254 |
| 3,862,445 | 1/1975 | Volkrodt | 310/154 |
| 3,906,268 | 9/1975 | de Graffenried | 310/154 |
| 4,091,300 | 5/1978 | Lynch et al. | 310/154 |
| 4,125,791 | 11/1978 | Futterer | 310/154 |
| 4,216,400 | 8/1980 | Lynch et al. | 310/154 |
| 4,363,987 | 12/1982 | Vorotyntseva et al. | 310/216 |
| 4,383,192 | 5/1983 | Sikorra | 310/154 |
| 4,516,046 | 5/1985 | Mercier | 310/154 |
| 4,528,469 | 7/1985 | Prenner et al. | 310/59 |

Primary Examiner—Thomas M. Dougherty
Assistant Examiner—Tran N. Nguyen
Attorney, Agent, or Firm—Laff, Whitesel, Conte & Saret, Ltd.

[57] ABSTRACT

A DC motor magnetic circuit configuration having reduced flux leakage and improved flux density that leads to greater motor efficiency and a higher motor constant. In one embodiment of the invention, and improved permanent magnet DC motor is provided that has a stator frame supporting a plurality of pole pieces in proximity to a rotor rotatably accommodated therein. The improvement comprises at least one of the pole pieces having a pole face lying in a plane that intersects both isotropic and anisotropic planes of the pole piece.

4 Claims, 4 Drawing Sheets

DC MOTOR MAGNETIC CIRCUIT CONFIGURATION WITH HIGH FLUX DENSITY

FIELD OF THE INVENTION

This invention relates generally to permanent magnet DC motors, and in particular to a permanent magnet DC motor employing a magnetic circuit configuration that yields a high flux density.

BACKGROUND OF THE INVENTION

Permanent magnet DC (direct current) motors are enjoying increasing popularity in applications requiring compact size, high torque, high efficiency, and low power consumption. Some examples of these applications include elevation and azimuth drives for aircraft control surfaces, aircraft throttle controls, drives for airborne radars, and drives for computer disk memory systems.

Efficiency of the magnetic circuit that provides magnetic flux through the rotor is of paramount importance in the design of an efficient permanent magnet DC motor. The magnetic circuit is the path in which magnetic lines of force are established.

FIG. 1 illustrates one embodiment of a permanent magnet DC motor of the prior art, generally depicted by the numeral 100. This embodiment includes a stator frame 101 formed from a magnetically conductive material (a material with a relatively high magnetic permeability), such as iron or low-carbon steel. Other materials are also suitable for stator construction.

Permanent magnets 102A-102D are affixed to the stator frame 101 to provide magnetic flux required for motor operation. In the illustrated embodiment, these permanent magnets 102A-102D are formed in the shape of rectangular plates having plane pole faces 103 that face inwardly toward a rotor 104 rotatably mounted on a shaft 105. Opposing pole faces present the same magnetic polarity to the rotor 104. In the embodiment depicted for example, opposing permanent magnet pole pieces 102A and 102B both present a north magnetic pole to the rotor 104, while pole pieces 102C and 102D present south magnetic poles.

This configuration gives rise to the magnetic flux distribution shown. A portion of the magnetic flux 106 from the upper pole piece 102A is directed through the rotor 104 to an adjacent pole piece 102D. Magnetic flux is directed through the stator frame 101 and back to the south magnetic pole of the upper pole piece 102A to complete the magnetic circuit. A second portion of the magnetic flux 106 from the upper pole piece 102A is directed through the rotor 104 to the other adjacent pole piece 102C, and returns to the upper pole piece 102A through the stator frame 106 in a separate magnetic circuit.

As can be appreciated from an examination of FIG. 1, each of the pole pieces 102A-102D forms a part of two distinct magnetic circuits through the adjacent pole to create the total flux distribution for the motor 100. However, all of the magnetic flux 106 is not properly directed through the rotor 104. Leakage flux 107 near the edges of the pole pieces 102A-102D forms very short magnetic circuits that do not reach the rotor 104.

This leakage flux 107 occurs primarily because the edges of the pole pieces 102A-102D are displaced from the rotor 104 by a larger amount that the central portions of the pole pieces, due to the planar construction of the pole pieces 102A-102D and the circular form of the rotor 104. The leakage flux 107 is simply unable to traverse the low permeability path of the increased air gap 108 near the pole edges to reach the relatively high-permeability rotor 104.

The alternative prior art motor configuration illustrated in FIG. 2, and generally depicted by the numeral 200, represents an effort to reduce the leakage flux shown in FIG. 1. Like reference numerals are used in FIG. 2 to indicate structures similar to those of FIG. 1.

Just as described above, the improved motor 200 includes a stator frame 101 of a relatively high permeability material, with a plurality of permanent magnet pole pieces 102A-102H affixed thereto. In the configuration shown in FIG. 2, the permanent magnet pole pieces 102A-102H are also rectangular plates having pole faces of planar construction, but are arranged as perpendicularly disposed adjacent poles of similar orientation. For example, a first pair of adjacent, perpendicular pole pieces 102A-102B each presents the same magnetic pole (in this case, a north magnetic pole) to the rotor 104.

A flux-focusing pole shoe 201 is disposed about the pole pieces 102A-102B and affixed thereto. The pole shoe 201 is generally formed from a magnetically conducting (high permeability) material, usually a sintered, iron-containing material that can be molded to shape during the sintering process to eliminate machining operations. As will be noted in FIG. 2, the interior surface of the pole shoe 201 has been formed to closely approximate the circular arc of the rotor 104 itself.

The interposition of the pole shoes 201 acts to reduce the effective air gap between the pole pieces 102A-102H and the rotor 104, resulting in a decrease in flux leakage and an improvement in motor efficiency. However, the sides of the pole shoes still provide a path for leakage flux 107, thus limiting the effectiveness of this configuration.

Accordingly, a need arises for a DC motor magnetic circuit configuration that acts to further reduce leakage flux and increase motor efficiency.

SUMMARY OF THE INVENTION

These needs and others are satisfied by the present invention, in which an improved permanent magnet DC motor is described having a stator frame supporting a plurality of pole pieces in proximity to a rotor rotatably accommodated therein. The improvement comprises at least one of the pole pieces having a pole face lying in a plane that intersects both isotropic and anisotropic planes of the pole piece. In one form, the stator frame is rectangular, and the plurality of pole pieces comprises eight pole pieces arranged as four pairs of pole pieces, with one pair of pole pieces disposed in each of the four corners of the rectangular stator frame. The pairs of pole pieces in adjacent corners have opposite magnetic orientations, while the pairs of pole pieces in opposite corners have the same magnetic orientation.

In one form of the invention, a permanent magnet DC motor comprises a stator frame, a rotor rotatably accommodated within the stator frame, a plurality of pole pieces supported by the stator frame with pole faces in proximity to the rotor, with at least one of the pole faces lying in a plane that is non-coplanar with the isotropic plane of the pole piece. The plurality of pole pieces comprises eight pole pieces arranged as four pairs of pole pieces. The stator frame is rectangular and a pair of pole pieces is disposed in each corner of the stator frame.

In a preferred form, each pair of pole pieces includes first and second orthogonally mounted pole pieces, each pole piece having exterior and interior sidewalls defining a planar pole face therebetween, with an exterior edge defined by the intersection of the pole face with the exterior sidewall and an interior edge defined by the intersection of the pole face with the interior sidewall. Each pole piece is mounted such that the interior edge is a first distance from the rotor and the exterior edge is a second distance from the rotor. The first distance is greater than the second distance.

In another form of the invention, a permanent magnet DC motor comprises a rectangular stator frame, a rotor rotatably accommodated within the stator frame, and a plurality of pole pieces arranged as four pairs of pole pieces, with one pair of pole pieces disposed in each corner of the stator frame. Each pair of pole pieces includes first and second orthogonally mounted pole pieces, each pole piece having interior and exterior sidewalls defining a planar pole face therebetween, with an exterior edge defined by the intersection of the pole face with the exterior sidewall and an interior edge defined by the intersection of the pole face with the interior sidewall.

Each pole face lies in a plane that intersects both isotropic and anisotropic planes of the pole piece, and each pole piece is mounted such that the interior edge is a first distance from the rotor and the exterior edge is a second distance from the rotor, with the first distance being greater than the second distance.

DETAILED DESCRIPTION OF THE INVENTION

In accordance with the present invention, a DC motor magnetic circuit configuration is described that provides distinct advantages when compared to permanent magnet DC motors of the prior art. The invention can best be understood with reference to the accompanying drawing figures.

Figure 1:
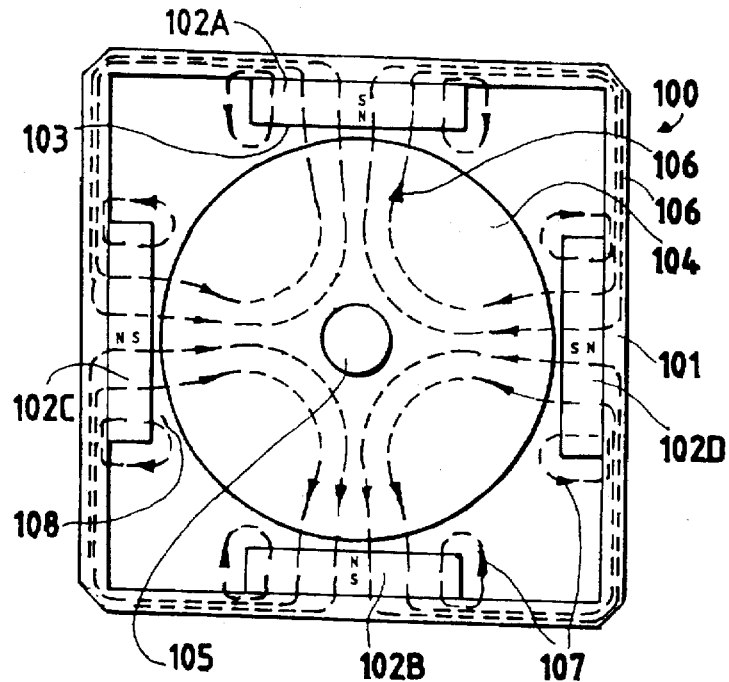
FIG. 1 illustrates one embodiment of a permanent magnet DC motor of the prior art.
Figure 2:
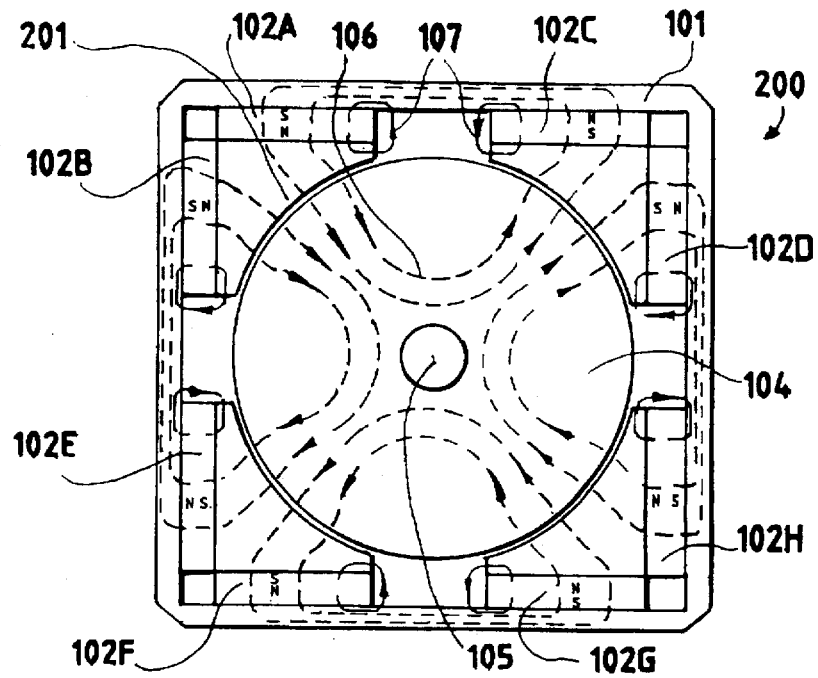
FIG. 2 depicts an alternative prior art DC motor configuration.
Figure 3:
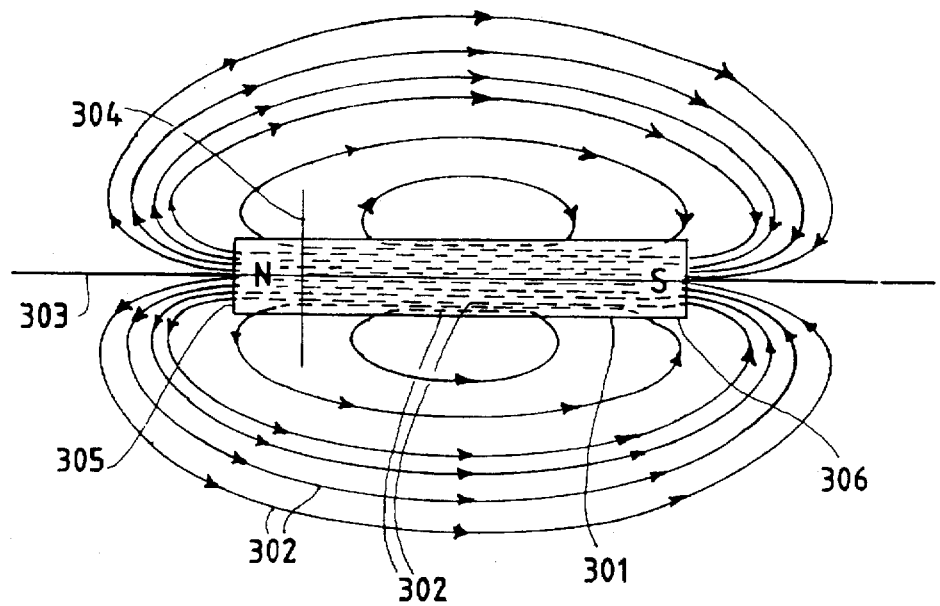
FIG. 3 is a side elevational view of a bar-shaped permanent magnet illustrating its associated magnetic field.

FIG. 3 is a side elevational view of a permanent magnet 301 in the shape of a bar having opposed, parallel end faces 305–306, illustrating its associated magnetic field. The magnetic field of the bar magnet 301 is represented by a plurality of lines of force 302, that, by convention, are shown leaving the north magnetic pole N of the bar magnet 301 and entering the south magnetic pole S. These lines of force 302 are also present in the magnet's interior, as illustrated by the dashed lines. These lines of force 302 are representative of the magnetic flux that surrounds the magnet 302, and, although the view of FIG. 3 is a planar view, magnetic flux surrounds the magnet 301 in all directions.

The bar magnet 301 of the illustration has a longitudinal axis 303 that is coincident with the direction of magnetization. The longitudinal axis 303 extends along the magnet's length and runs through the north pole N and the south pole S, parallel to the lines of force 302 interior to the magnet. A plane 304 can be constructed that intersects the magnet 301 perpendicular to its longitudinal axis 303 and parallel to the opposed, parallel end faces 305–306. This plane 304 is an isotropic plane for the magnet 301 of FIG. 3.

Figure 4:
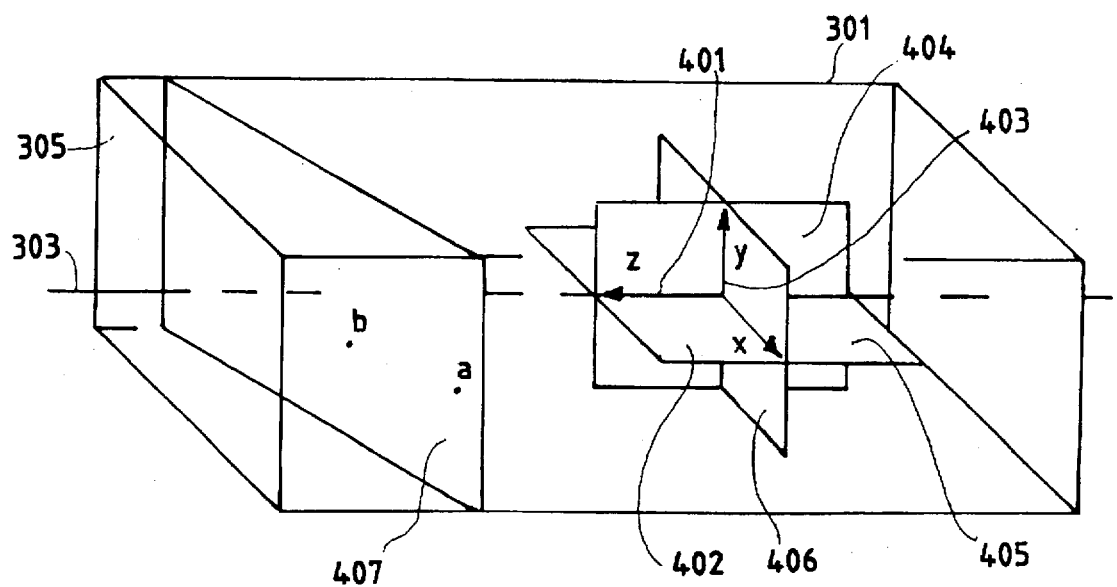
FIG. 4 depicts a portion of the bar magnet of FIG. 3, showing isotropic and anisotropic planes.

The concept of an isotropic plane is illustrated more clearly in FIG. 4, which depicts a portion of the bar magnet 301 of FIG. 3. As discussed above, the direction of magnetization of the bar magnet 301 is coincident with the longitudinal axis 303 of the magnet 301. A coordinate system has been constructed internal to the bar magnet, including an axis z 401 that is parallel to the longitudinal axis 303, and mutually perpendicular axes x 402 and y 403, both of which are also perpendicular to axis z 401.

Axes x 402 and y 403 lie in a plane 406 that is perpendicular to the direction of magnetization. Every point in this plane 406 is at the same magnetic potential. In other words, the plane 406 is a magnetic equipotential surface. Since the magnetic potential in the plane 406 is invariant with respect to direction, the plane 406 is an isotropic plane of the magnet 301. Points that lie in plane 404, in which the y 403 and z 401 axes reside, vary in magnetic potential (the magnetomotive force changes) as one moves along the z axis 401. Thus, the plane 404 is an anisotropic plane of the magnet 301, as is plane 405 for similar reasons.

The end face 305 of the magnet 301 also lies in an isotropic plane if the end face is planar and perpendicular to the longitudinal axis 303. Plane 407, however, which is angled with respect to the end face 305 of the magnet 301, is an anisotropic plane, since a magnetomotive force gradient exists between points a and b that lie in the plane 407.

Figure 5:
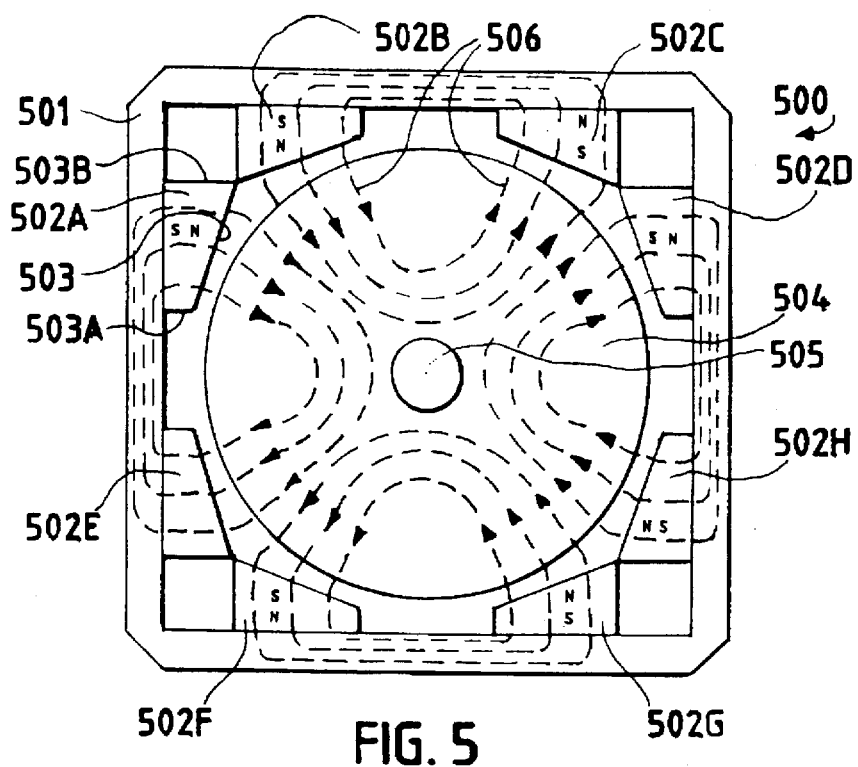
FIG. 5 illustrates a permanent magnet DC motor in accordance with the present invention.

FIG. 5 illustrates a DC motor magnetic circuit configuration in accordance with the present invention. A permanent magnet DC motor, generally depicted by the numeral 500, has a stator frame constructed from a magnetically conductive (high permeability) material. Mounted to the stator frame 501 are four pairs of pole pieces 502A–502H comprising permanent magnets. These pole pieces 502A–502H differ in both arrangement and construction from those of the prior art.

The pole pieces 502A–502H are disposed such that adjacent pole pieces (502A–502B, for example) have the same magnetic pole orientation. Pole pieces 502A and 502B both present a magnetic north pole toward the rotor 504, which is rotatably accommodated by a rotor shaft 505. The pair of pole pieces 502G–502H in the opposite corner of the stator frame 501 also present north magnetic poles toward the rotor 504.

The pair of pole pieces 502C–502D adjacent to pole pieces 502A–502B present south magnetic poles toward the rotor 504, as does the pair 502E–502F opposite pole pieces 502C–502D. The magnetic circuit for the motor 500 is established by magnetic flux 506 from the north pole of one of pole pieces (502B, for example) passing through the rotor 504 and entering the south magnetic pole of one of the pole pieces 502C of the adjacent pair. Each portion of the magnetic circuit is completed by magnetic flux 506 returning to the south pole of the pole piece 502B through the stator frame 501.

No flux concentrating pole shoes are needed in the configuration shown in FIG. 5. This is because the planar pole face 503 of each pole piece, defined by exterior and interior parallel sidewalls 503A and 503B, respectively, is angled with respect to the isotropic plane of the pole piece (502A, for example), rather than being parallel to the isotropic plane as in prior art implementations. This configuration allows the edge of the pole face 503 nearest the exterior sidewall 503A to be brought into close proximity to the rotor 504, as shown.

Magnetic flux leakage is normally concentrated in the area of the pole face 503 nearest the exterior sidewall 503A. The inventive configuration positions this portion of the pole face 503 so close to the rotor 504 that magnetic flux is induced to enter the relatively high permeability rotor material rather than seek a shorter return path directly to the stator material.

This angled pole face configuration does result in a larger air gap between the pole face 503 and the rotor 504 near the interior sidewall 503B of the pole piece 502A. However, this larger air gap is compensated for by increased magnetomotive force in the vicinity of the interior sidewall 503B, due to the longer magnet length in this region, and the proximity of the adjacent magnet's 502B own flux field 506. The drastically reduced leakage flux results in an appreciable increase in motor performance.

Figure 6:
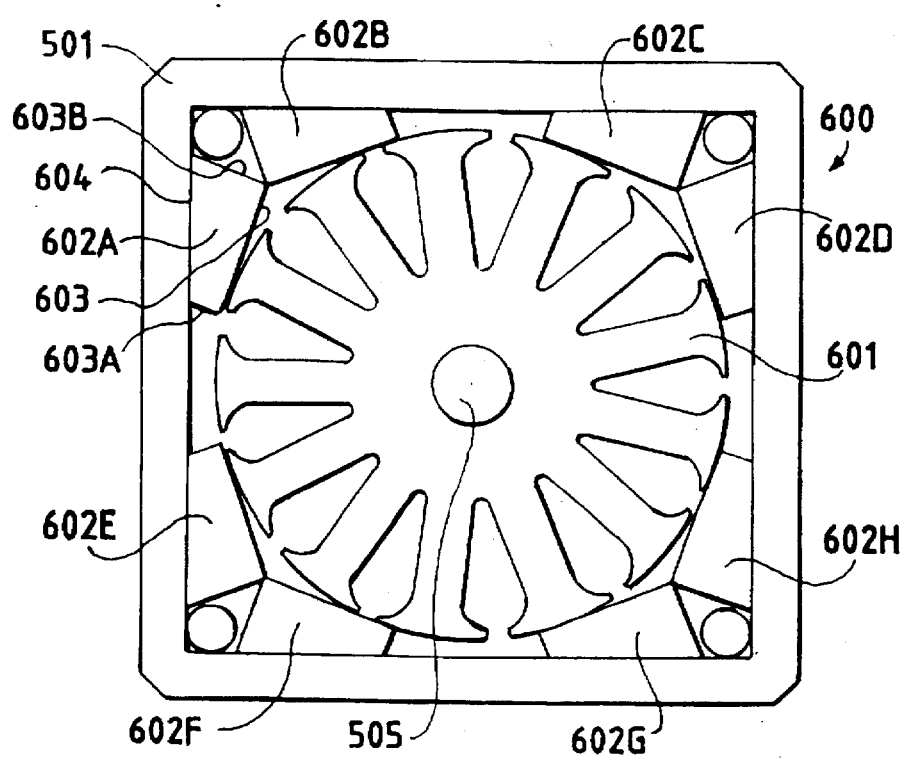
FIG. 6 illustrates an alternative embodiment of a permanent magnet DC motor in accordance with the present invention.

FIG. 6 illustrates an alternative embodiment of the permanent magnet DC motor of the present invention, generally depicted by the numeral 600. The same reference numerals used in FIG. 5 have been adopted for like components. The motor 600 includes a stator frame 501 within which a rotor 601 is rotatably accommodated. The rotor 601 includes armature portions about which armature windings (not shown) are disposed.

The pole pieces (602A and 602B, for example) each have a first pole face 603 in proximity to the rotor 601 and a second pole face 604 in proximity to the stator frame 501. In this embodiment, the first pole face 603 lies in the isotropic plane, while the second pole face 604 lies in a plane that intersects both the isotropic and anisotropic planes of the pole piece 602A. The configuration depicted in FIG. 6, in which the pole pieces 602A-602H are essentially reversed from end to end when compared with the configuration shown in FIG. 5, is approximately as effective as the FIG. 5 arrangement in reducing leakage flux. This is because the portion of the pole face 603 nearest the exterior sidewall 603A can still be positioned very close to the rotor periphery, thus providing a high permability path for magnetic flux. Just as in the FIG. 5 embodiment, increased magnetomotive force in the vicinity of the interior sidewall 603B, due to the increased length of the pole piece 602A in this area, compensates for the air gap that occurs between the rotor and pole pieces in the region between adjacent pole pieces (the region between pole pieces 602A and 602B, for example).

Figure 7:
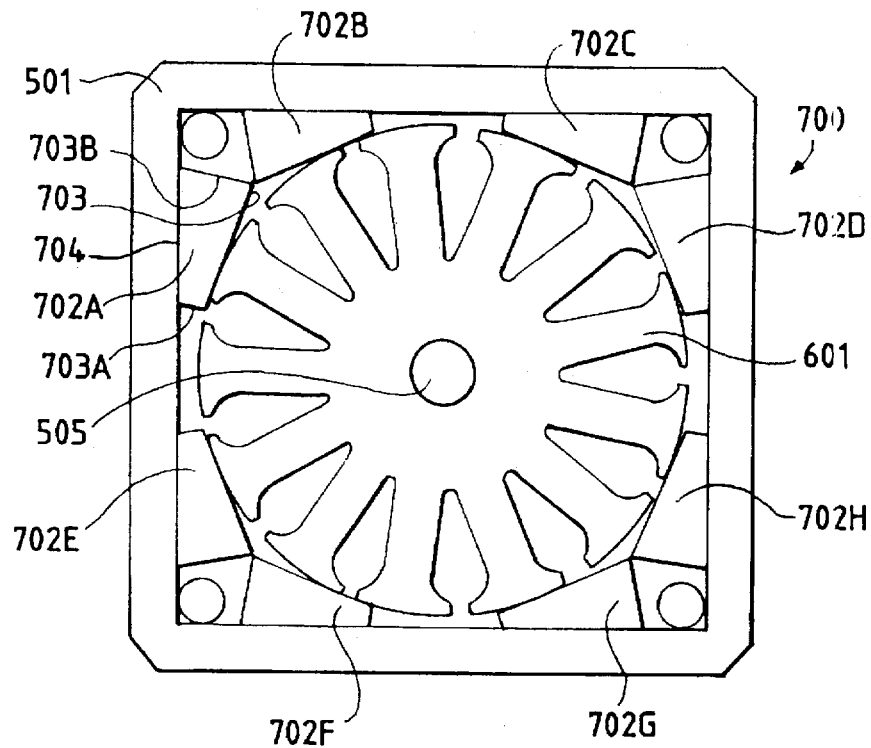
FIG. 7 illustrates another alternative embodiment of a permanent magnet DC motor in accordance with the present invention.

FIG. 7 illustrates another alternative embodiment of the permanent magnet DC motor of the present invention. In the configuration shown in FIG. 7, the pole pieces 702A-702H are formed such that each pole piece (702A, for example) has a first pole face 703 proximate to the rotor 601 and a second pole face 704 proximate to the stator frame 501. In the embodiment of FIG. 7, both the first pole face 703 and the second pole face 704 lie in planes that intersect both the isotropic and anisotropic planes of the pole piece 702A.

Figure 8:
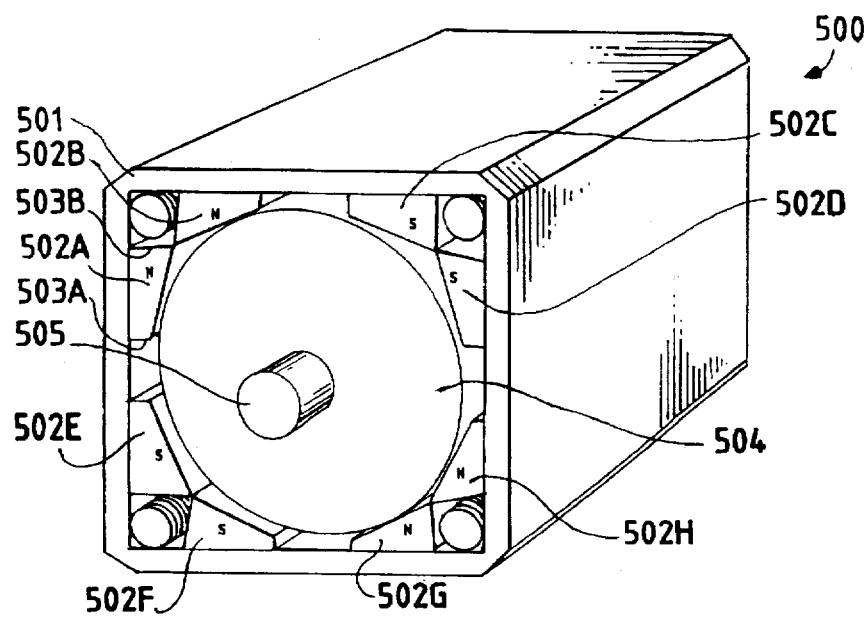
FIG. 8 is a perspective view of a permanent magnet DC motor in accordance with the present invention, shown with the end plate removed to reveal interior details.

FIG. 8 is a perspective view of the permanent magnet DC motor 500 in accordance with the present invention, shown with the end plate removed to reveal interior details. It will be noted from the figure that the motor 500 is generally cube-like in appearance, although the motor 500 could be elongated axially to provide increased torque. The rotor 504 includes armature portions that accommodate armature windings, and the motor 500 includes brush and commutator arrangements required for proper operation. Such features well-known in the applicable art are not shown in the figure for the sake of clarity.

The pole pieces 502A–502H are preferably constructed from a Neodymium-Iron-Boron alloy, although other combinations of magnetic materials may also function adequately in this application. In the preferred embodiment, each pole face 503 is formed at an angle of about 22.6 degrees with respect to the isotropic plane of the pole piece 502A. Because of the pole face geometry, the motor 500 can accommodate a rotor 504 having a larger diameter than motors of the prior art, yielding an improved torque constant.

Because the interior sidewall 503B of each pole piece 502A is longer than the exterior sidewall 503A, magnetomotive force is increased in the region adjacent to the interior sidewall 503B, which corresponds to the area of highest flux concentration. The cumulative effect of these improvements in motor configuration yields an overall improvement in motor constant, over prior art motors of similar size, on the order of 65 percent.

There has been described herein a DC motor magnetic circuit configuration that is relatively free from the shortcomings of the prior art. It will be apparent to those skilled in the art that modifications may be made without departing from the spirit and scope of the invention. Accordingly, it is not intended that the invention be limited except as may be necessary in view of the appended claims.

What is claimed is:

1. A permanent magnet DC motor comprising:

a rectangular stator frame;

a rotor rotatably accommodated within the stator frame;

a plurality of pole pieces comprising eight pole pieces arranged as four pairs of pole pieces, said plurality of pole pieces supported by the stator frame with pole faces in proximity to the rotor, a pair of pole pieces disposed on each corner of said stator frame;

at least one of the pole faces lying in a plane that is non-coplanar with the isotropic plane of the pole piece, wherein each pair of pole pieces includes first and second orthogonally mounted pole pieces, each pole pieces having exterior and interior sidewalls defining a planar pole face therebetween, with an exterior edge defined by the intersection of the pole face with the exterior sidewall and an interior edge defined by the intersection of the pole face with the interior sidewall.

2. The permanent magnet DC motor of claim 1, wherein each pole piece is mounted such that the interior edge is a first distance from the rotor and the exterior edge is a second distance from the rotor.

3. The permanent magnet DC motor of claim 2, wherein the first distance is greater than the second distance.

4. A permanent magnet DC motor comprising:

a rectangular stator frame;

a rotor rotatably accommodated within the stator frame;

a plurality of pole pieces arranged as four pairs of pole pieces, with one pair of pole pieces disposed in each corner of the stator frame;

each pair of pole pieces including first and second orthogonally mounted pole pieces, each pole piece having interior and exterior sidewalls defining a planar pole face therebetween, with an exterior edge defined by the intersection of the pole face with the exterior sidewall and an interior edge defined by the intersection of the pole face with the interior sidewall;

each pole face lying in a plane that intersects both isotropic and anisotropic planes of the pole piece; and each pole piece being mounted such that the interior edge is a first distance from the rotor and the exterior edge is a second distance from the rotor, with the first distance being greater than the second distance.

* * * * *